(12) United States Patent
Lefebvre et al.

(10) Patent No.: US 12,704,080 B1
(45) Date of Patent: Aug. 11, 2026

(54) HOT GAS INTAKE SCROLL CASE ASSEMBLY FOR AIRCRAFT ENGINE

(71) Applicant: PRATT & WHITNEY CANADA CORP., Longueuil (CA)

(72) Inventors: Guy Lefebvre, Longueuil (CA); Francois Doyon, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 19/303,481

(22) Filed: Aug. 19, 2025

(51) Int. Cl.
*F01D 25/24* (2006.01)
*B64D 27/10* (2006.01)

(52) U.S. Cl.
CPC ........... *F01D 25/243* (2013.01); *B64D 27/10* (2013.01); *F05D 2230/21* (2013.01); *F05D 2260/31* (2013.01)

(58) Field of Classification Search
CPC ........ F01D 25/243; F01D 25/24; F01D 25/26; B64D 27/10; F05D 2230/21; F05D 2260/31
USPC .......................................................... 415/204
See application file for complete search history.

(56) References Cited

U.S. PATENT DOCUMENTS

| | | | |
|---|---|---|---|
| 5,274,997 A * | 1/1994 | Inoue ........................ | F02C 7/36 165/8 |
| 10,160,004 B2 | 12/2018 | Beck et al. | |
| 10,655,859 B2 * | 5/2020 | Smoke .................... | F01D 9/023 |
| 12,264,595 B2 | 4/2025 | Lefebvre et al. | |
| 2024/0182178 A1 * | 6/2024 | Lefebvre ............... | F02B 37/105 |

FOREIGN PATENT DOCUMENTS

| | | |
|---|---|---|
| FR | 2513312 A1 | 3/1983 |

* cited by examiner

*Primary Examiner* — Michael L Sehn
(74) *Attorney, Agent, or Firm* — NORTON ROSE FULBRIGHT CANADA LLP

(57) ABSTRACT

A scroll case configured for directing combustion gases to a turbine section of an aircraft engine, comprises an outer shell extending around a central axis and having an inlet for receiving the combustion gases, and an inner casting received inside the outer shell and defining therewith a conduit extending around the central axis from the inlet to an axially oriented outlet for directing the combustion gases to the turbine section of the aircraft engine. The inner casting has vanes circumferentially distributed around the central axis and projecting axially across the conduit from a front axially facing surface of the inner casting to a rear axially facing surface of the outer shell. The vanes are fastened to the rear axially facing surface of the outer shell around the axially oriented outlet.

16 Claims, 6 Drawing Sheets

HOT GAS INTAKE SCROLL CASE ASSEMBLY FOR AIRCRAFT ENGINE

TECHNICAL FIELD

The disclosure relates to aircraft engines and, more particularly, to a scroll case assembly for directing combustion gases to a turbine section of such engines.

BACKGROUND OF THE ART

In certain engine architectures, aerodynamic flow distributors, such as scroll or volute structures, are used to receive combustion gases and to regulate them in a suitable manner before the combustion gases meet stator vanes or rotor blades of the downstream turbine(s). It may be desired to orient the hot gas flow such that it meets downstream turbine blades at a suitable angle. Existing ways to do this are satisfactory for their intended purposes, but improvements are sought.

SUMMARY

In one aspect, there is provided a scroll case assembly for directing combustion gases to a turbine section of an aircraft engine, the scroll case assembly comprising: an outer shell extending around a central axis and having an inlet for receiving the combustion gases; an inner casting received inside the outer shell and defining therewith a conduit extending around the central axis from the inlet to an axially oriented outlet for directing the combustion gases to the turbine section of the aircraft engine, the inner casting having vanes circumferentially distributed around the central axis and projecting axially across the conduit from a front axially facing surface of the inner casting to a rear axially facing surface of the outer shell, the vanes fastened to the rear axially facing surface of the outer shell around the axially oriented outlet.

In another aspect, there is provided an aircraft engine comprising: a combustion engine having an exhaust, the combustion engine drivingly engaged to a load rotatable relative to a central axis; a turbine section in driving engagement with the load to compound power with the combustion engine; and a scroll case assembly fluidly interconnecting the exhaust of the combustion engine to the turbine section, the scroll case assembly comprising: an outer casting in the form of a shell extending in a non-axisymmetric fashion around a central axis and defining an inlet fluidly connected to the exhaust of the combustion engine; an inner casting axially inserted inside the outer casting to define therewith a conduit extending around the central axis from the inlet to an outlet fluidly connected to the turbine section of the aircraft engine, the inner casting having vanes circumferentially distributed around the central axis and projecting axially across the conduit from a front axially facing surface of the inner casting to a rear axially facing surface of the outer casting, the inner casting fastened to the outer casting via a first bolted joint interface at a front end of the scroll case assembly and a second bolted joint interface at a rear end of the scroll case assembly, the first bolted joint interface and the second bolted joint interface spaced radially from one another.

In a further aspect, there is provided a method for manufacturing a scroll case of an aircraft engine, the scroll case configured to fluidly connect a combustion engine to a turbine section of the aircraft engine, the method comprising: casting an outer shell extending in a non-axisymmetric fashion around a central axis; casting an inner part including a circumferential array of vanes extending axially from a front annular wall; axially inserting the inner part inside the outer shell; and securing the inner part to the outer shell at a front bolted join interface and a rear bolted join interface.

DESCRIPTION OF THE DRAWINGS

Reference is now made to the accompanying figures in which.

DETAILED DESCRIPTION

Figure 1:
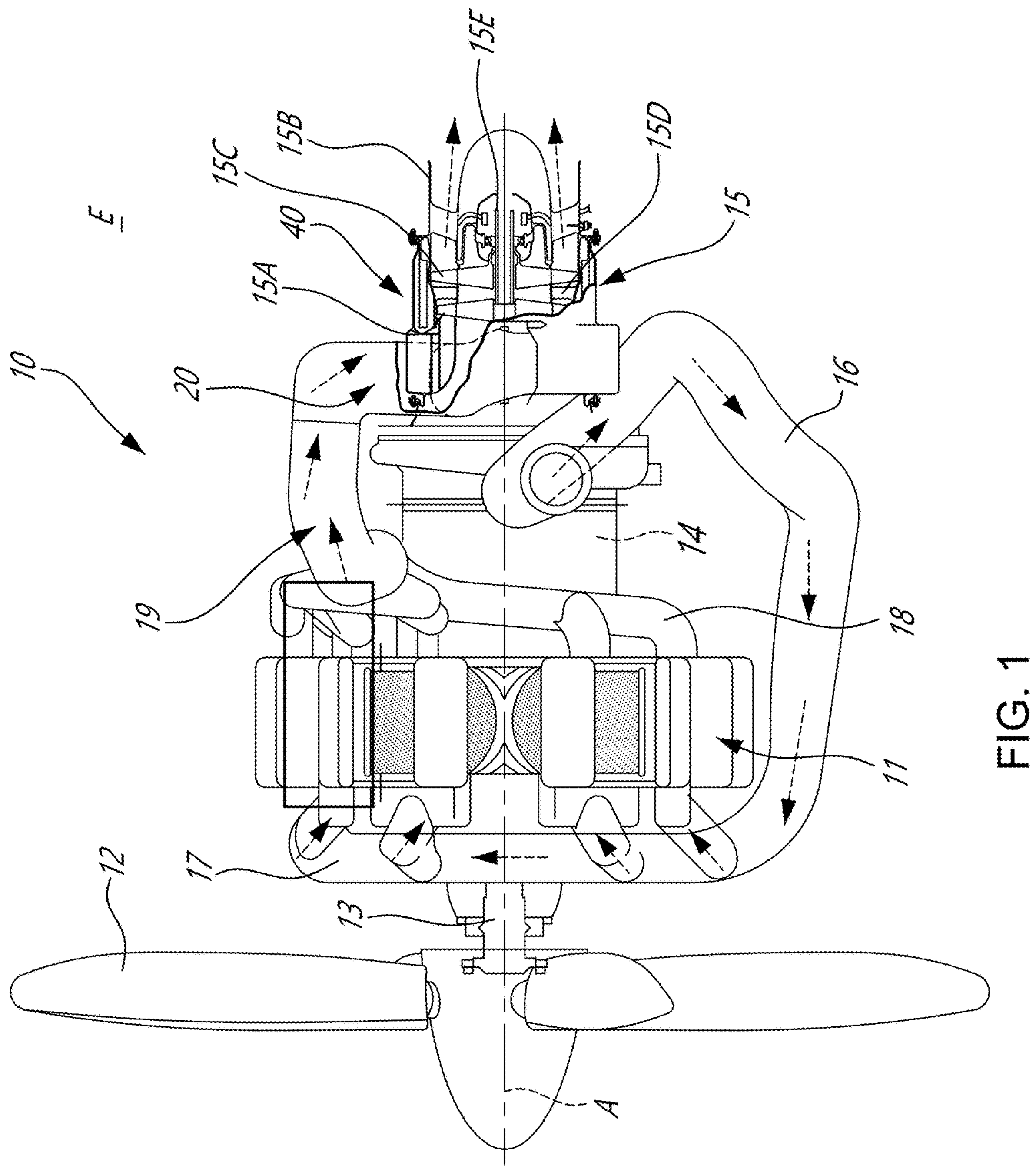
FIG. 1 is a schematic side view, partly in cross-section, of an aircraft engine.

Referring to FIG. 1, an aircraft engine 10 is schematically shown. The aircraft engine 10 comprises a thermal engine module 11 including one or more internal combustion engine(s), drivingly engaged to a rotatable load 12, herein depicted as a propeller, via an output shaft 13. It will be appreciated that the thermal engine module 11 may include any suitable engine, such as a gas turbine engine, a rotary engine, a piston engine, and so on. The output shaft 13 may correspond to an engine shaft of the thermal engine module 11. The thermal engine module 11 may include any engine having at least one combustion chamber of varying volume. For instance, the thermal engine module 11 may comprise one or more piston engine(s) or one or more rotary engine(s) (e.g., Wankel engines). In some embodiments, the aircraft engine 10 may further include an electric motor drivingly engaged to the output shaft 13 to assist the thermal engine module 11 in driving the output shaft 13 and the rotatable load 12 (e.g., propeller) mounted thereto.

The aircraft engine 10 further includes a compressor 14 having a compressor inlet receiving ambient air from the environment E outside the aircraft engine 10 and a compressor outlet fluidly connected to an air inlet of the thermal engine module 11. The compressor 14 outputs compressed air from the compressor outlet to the thermal engine module 11 via a compressed air conduit 16 and a manifold 17. The compressed air conduit 16 and the manifold 17 may include any suitable arrangement of pipes configured to distribute compressed air between the different combustion chambers of the thermal engine module 11. Any other suitable configurations used to supply compressed air to the thermal engine module 11 are contemplated without departing from the scope of the present disclosure.

The aircraft engine 10 further includes a turbine section 15 having an axially facing turbine inlet 15A fluidly connected to an engine outlet of the thermal engine module 11. The turbine section 15 has a turbine exhaust case 15B via which combustion gases are expelled to the environment E. The turbine exhaust case 15B may include a tailpipe or any other suitable structures (e.g., exhaust mixer) for discharging the combustion gases from the aircraft engine 10.

Figure 2:
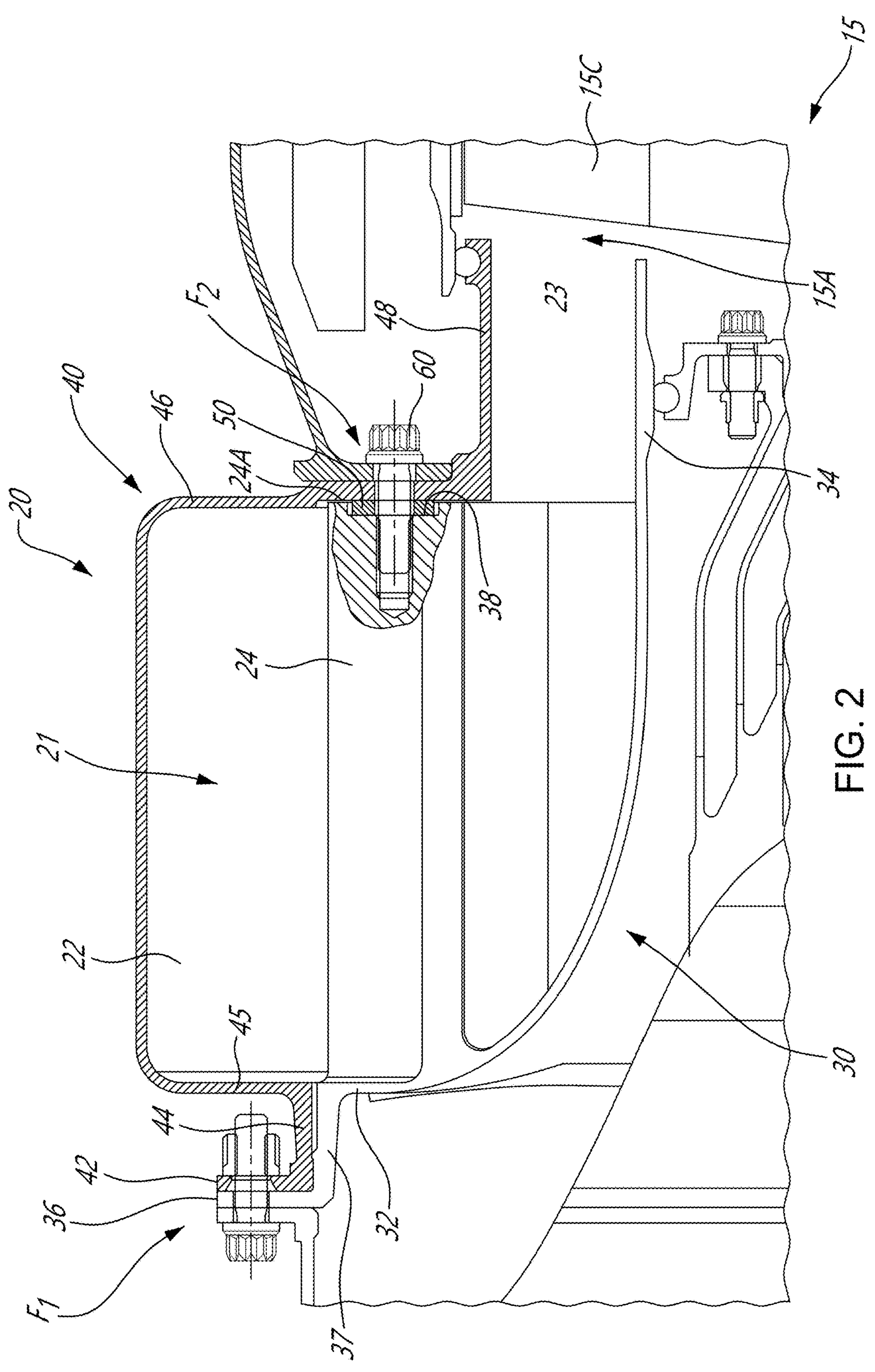
FIG. 2 is a cross-section view of a portion of the aircraft engine of FIG. 1 illustrating a hot section of the aircraft engine including a scroll case assembly for directing hot combustion gases to a high-pressure turbine of the turbine section of the aircraft engine.

Referring jointly to FIGS. 1-2, in one or more embodiment(s), the turbine section 15 includes an axial turbine having successive rows of rotor(s) 15C and stator(s) 15D disposed in alternation along a central axis A of the aircraft engine 10. The rotor(s) 15C may include rotor blades mounted to rotor discs. The stator(s) 15D may include stator vanes secured at opposite ends to inner and outer shrouds. In other words, the turbine section 15 may include a plurality of stages each including a stator and a rotor. The rotors 15C of the turbine section 15 are in driving engagement with a turbine shaft 15E. The turbine shaft 15E may be drivingly engaged to the output shaft 13, which may correspond to the engine shaft of the thermal engine module 11. Therefore, the turbine section 15 may compound power with the thermal engine module 11 to drive the rotatable load 12. In other words, the turbine shaft 15E may be drivingly engaged to the engine shaft of the thermal engine module 11 via suitable gearing. In the embodiment shown, the turbine shaft 15E is drivingly engaged to a compressor shaft of the compressor 14. Thus, the turbine section 15 may drive both the rotatable load 12 and the compressor 14. In the exemplified embodiment, the engine shaft of the thermal engine module 11, the output shaft 13, and the turbine shaft 15E are all coaxial about the central axis A. However, in other configurations, the turbine section 15 and/or the compressor 14 may have respective shafts radially offset from one another relative to the central axis A.

As shown in FIG. 1, the engine outlet of the thermal engine module 11 is fluidly connected to an exhaust manifold 18 that receives combustion gases outputted by the combustion chambers or by a combustor of the thermal engine module 11. The exhaust manifold 18 collects the combustion gases from the different combustion chambers and flows these combustion gases to a combustion engine exhaust pipe 19. As schematically depicted by the flow arrows in FIG. 1, the combustion gases are flowing within the combustion engine exhaust pipe 19 and reach the turbine section 15 in a direction being mainly radial relative to the central axis A and which may include a circumferential component relative to the central axis A. However, the turbine section 15 includes an axial turbine and therefore the turbine inlet 15A receives the combustion gases along a direction being mainly axial relative to the central axis A. To redirect the combustion gases from a direction being mainly radial to a direction being mainly axial, that is, to decrease a radial component of a direction of the combustion gases, the aircraft engine 10 further includes a scroll case 20 that regulates and reorients the combustion gases so that they meet an upstream most of the high pressure stages of the turbine section 15 at the most appropriate angle of attack. The scroll case 20 may therefore be disposed upstream (e.g., axially forwardly according to the illustrated embodiment) of the turbine section 15 to adequately orient the combustion gases at the most appropriate angle to meet the upstream-most airfoils of the turbine section 15.

Referring to FIG. 2, as shown in the exemplified embodiment, the scroll case 20 defines a conduit 21 extending around the central axis A from an inlet 22 to an outlet 23. The inlet 22 is fluidly connected to the combustion engine exhaust pipe 19 (FIG. 1), whereas the outlet 23 is fluidly connected to the turbine inlet 15A of the turbine 15. According to the illustrated embodiment, the inlet 22 of the conduit 21 has a tangential component and the outlet 23 is an annular outlet facing axially in a rearward direction and in alignment with the annular gas path of the turbine section 15. This configuration allows injecting the combustion gases in a direction being mainly axial relative to the central axis A to meet the axial inlet of the turbine section 15. As will be seen hereinafter, the scroll case 20 has a circumferential array of axially extending vanes 24 inside the conduit 21 to direct and regulate the flow of combustion gases between the inlet 22 and the outlet 23.

According to some embodiments, the conduit 21 comprises a non-axisymmetric portion extending downstream from the inlet 22 and spiraling towards the central axis A. As it progresses circumferentially around the central axis A, the non-axisymmetric portion of the conduit 21 transitions or merges with an axisymmetric portion, which forms a 360 degrees axisymmetric structure around the central axis A. The axisymmetric portion extends downstream from the non-axisymmetric portion to the outlet 23.

Figure 3:
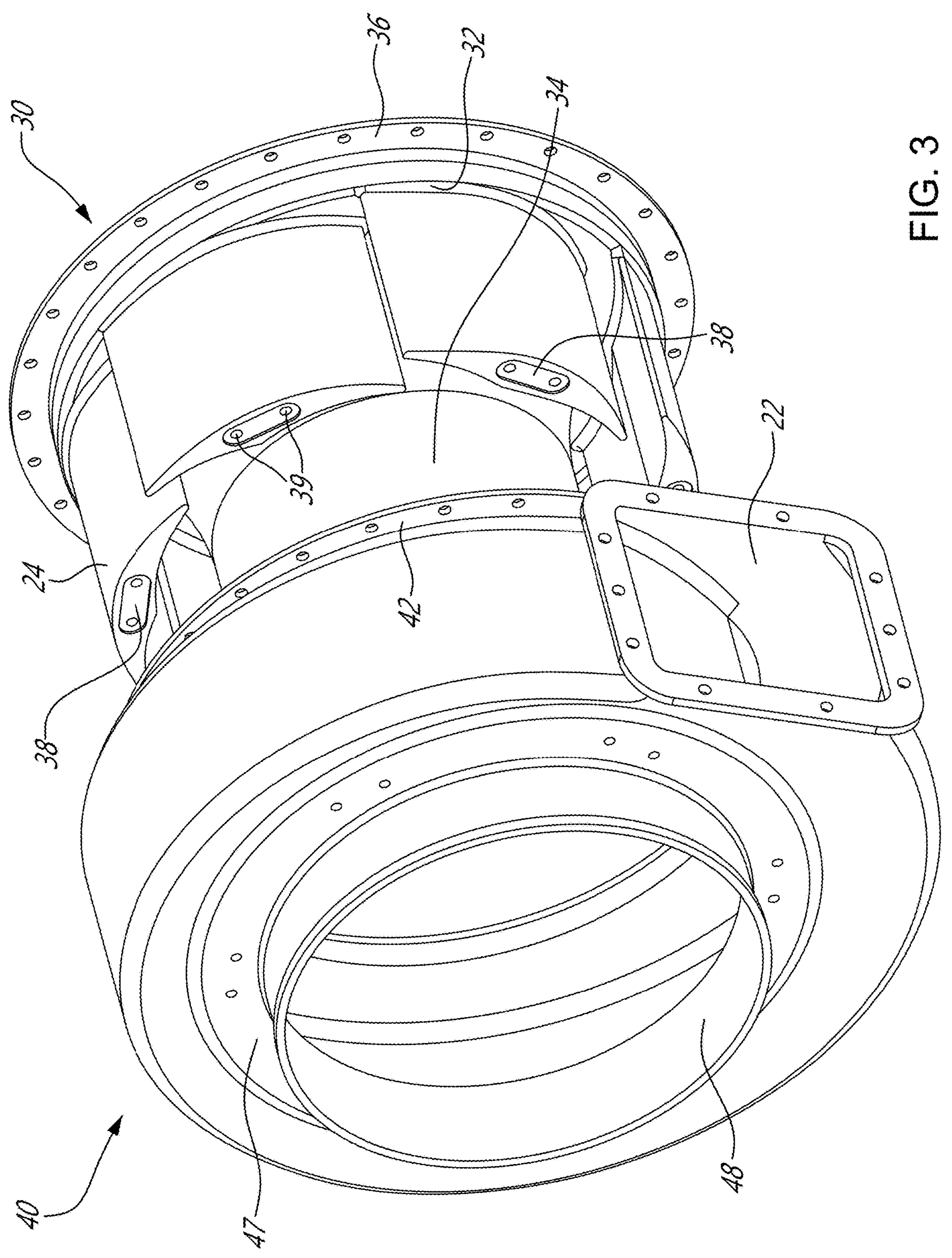
FIG. 3 is an exploded rear perspective view of the scroll case assembly illustrating a vaned inner part an outer shell part.
Figure 4:
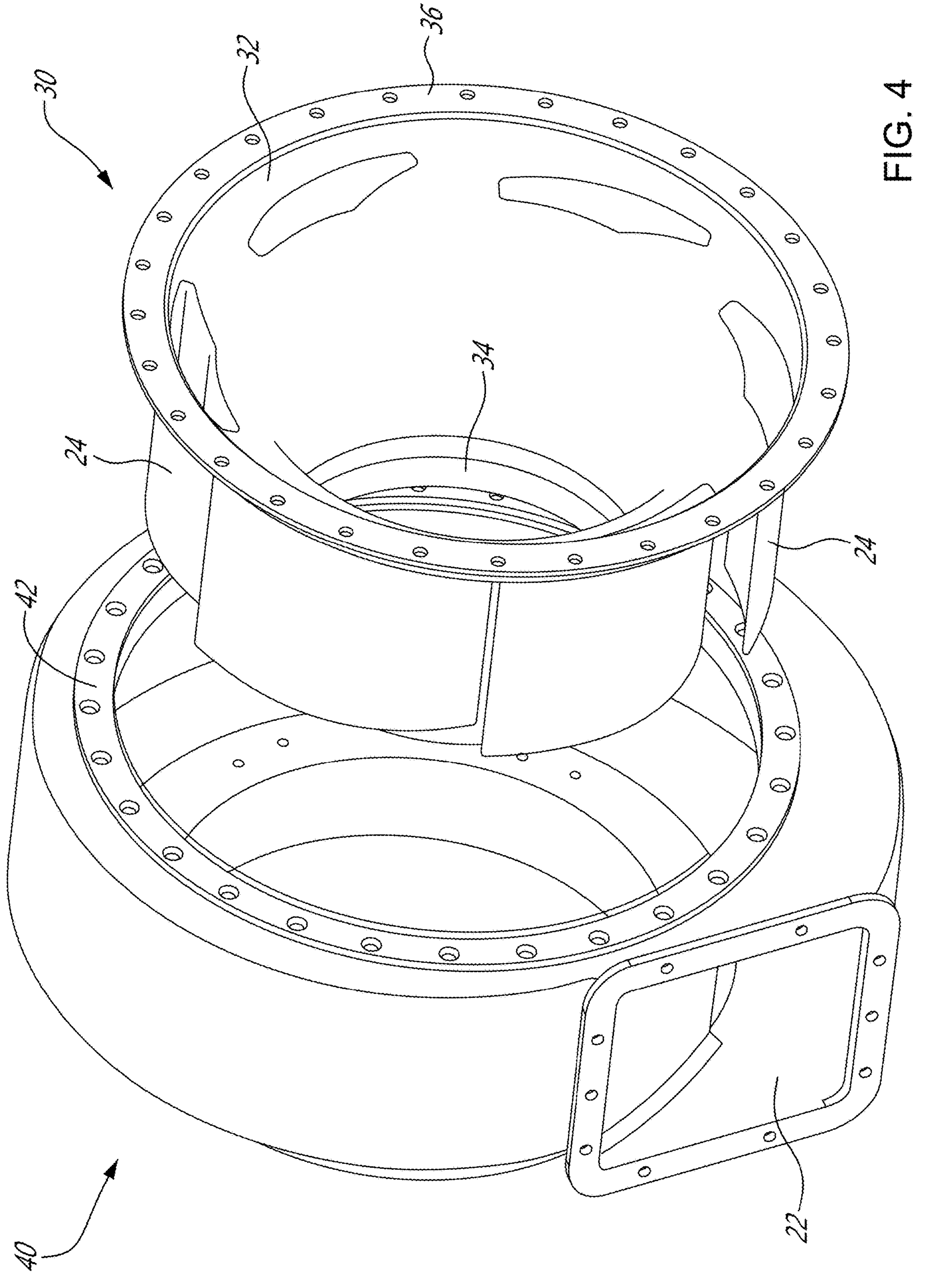
FIG. 4 is an exploded front perspective view of the scroll case assembly.
Figure 5:
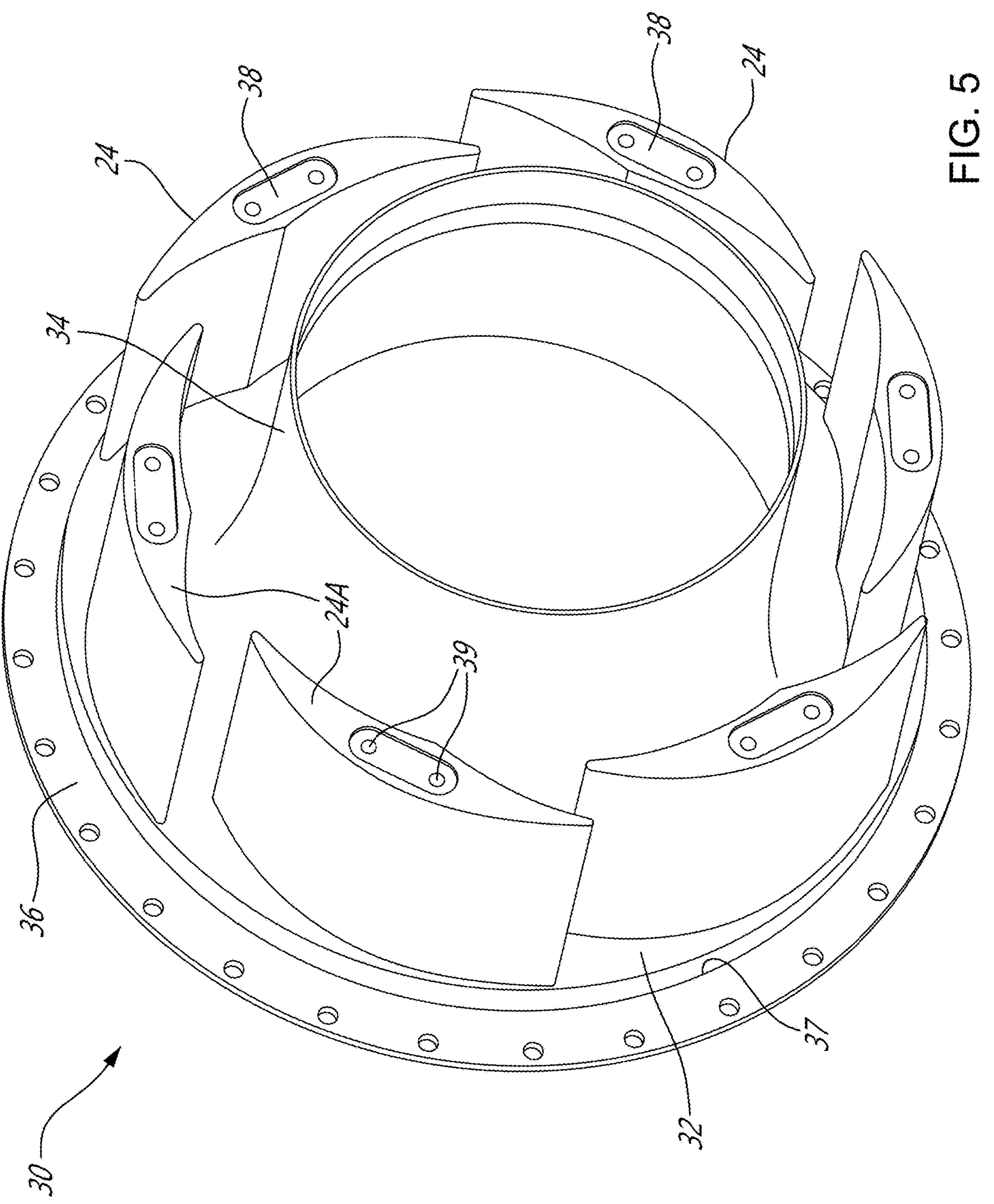
FIG. 5 is rear perspective view of the vaned inner part of the scroll case assembly.

The manufacturing of such a scroll case with internal vanes is challenging, at least in part, due to the shape of the vanes and the non-uniform shape of the scroll. Producing such a complex geometry as a single piece or unitary component has proven to be challenging. For instance, the use of a 3D printing process, may necessitate multiple inclined surfaces to support the material used for printing. To be printed, the shape of the vanes and/or other surfaces of the scroll case would thus need to be modified, which is not desirable to meet the aerodynamic performance requirements of the scroll. The manufacturability of the scroll case may be improved and, thus, the manufacturing costs minimized by designing the scroll case as an assembly of parts that may be individually produced and then assembled, such as by bolting, to form a scroll case assembly. For instance, as best shown in FIGS. 2-4, the scroll case 20 may be conveniently made from an assembly of two main parts, a first or inner casting 30 including the circumferential array of vanes 24 and a second or outer casting 40 provided in the form of a shell extending in a non-asymmetric fashion around the central axis to provide for the non-circumferentially uniform or non-axisymmetric shape of the scroll, the inner and outer castings 30, 40 detachably assembled to one another at a first bolted joint interface F1 at a front end of the scroll case assembly and at a second bolted joint interface F2 at a rear end of the scroll case assembly. Both the inner casting 30 and the outer casting 40 are best designed for production via traditional casting techniques. This may contribute to minimize the manufacturing costs while providing the required flexibility to accommodate the complex geometry of the scroll case.

Referring to FIGS. 2 to 6, an embodiment of the scroll case assembly is described in more details. It can be appreciated that the inner casting 30 generally comprises a circumferential array of vanes 24 extending axially from a front axially facing annular wall or surface 32 to respective distal ends 24A. The radially inner end portion of the front axially facing annular wall or surface 32 merges into a rearwardly axially extending central cylinder 34 disposed concentrically within the circumferential array of vanes 24. As shown in FIG. 2, the central cylinder 34 extends axially rearwardly beyond the distal end 24A of the vanes 24 to form the radially inner wall of the axially facing annular outlet 23 of the scroll case 20. The inner casting 30 further includes a front annular bolting flange 36. The front annular bolting flange 36 of the inner casting 30 extends radially outwardly from an outer diameter surface of a front cylindrical protrusion 37 (FIG. 2) extending axially from the front axially facing annular wall or surface 32 in an axial direction opposite to the vanes 24. The front annular bolting flange 36 is disposed radially outwardly from the circumferential array of vanes 24 relative to the central axis A of the inner casting 30. According to some embodiments, each vane 24 may have a hollow airfoil profile. As best show in FIGS. 2, 3 and 5, a recess 38 may also be defined in the distal end 24A of each vane 24 to receive a corresponding classified spacer 50 (FIG. 2). As will be seen hereinafter, the spacers 50 may be used to accommodate tolerance stack-up between the inner and outer castings 30, 40 and, thus, minimize mechanical stresses at the second bolted joint interface F2.

Figure 6:
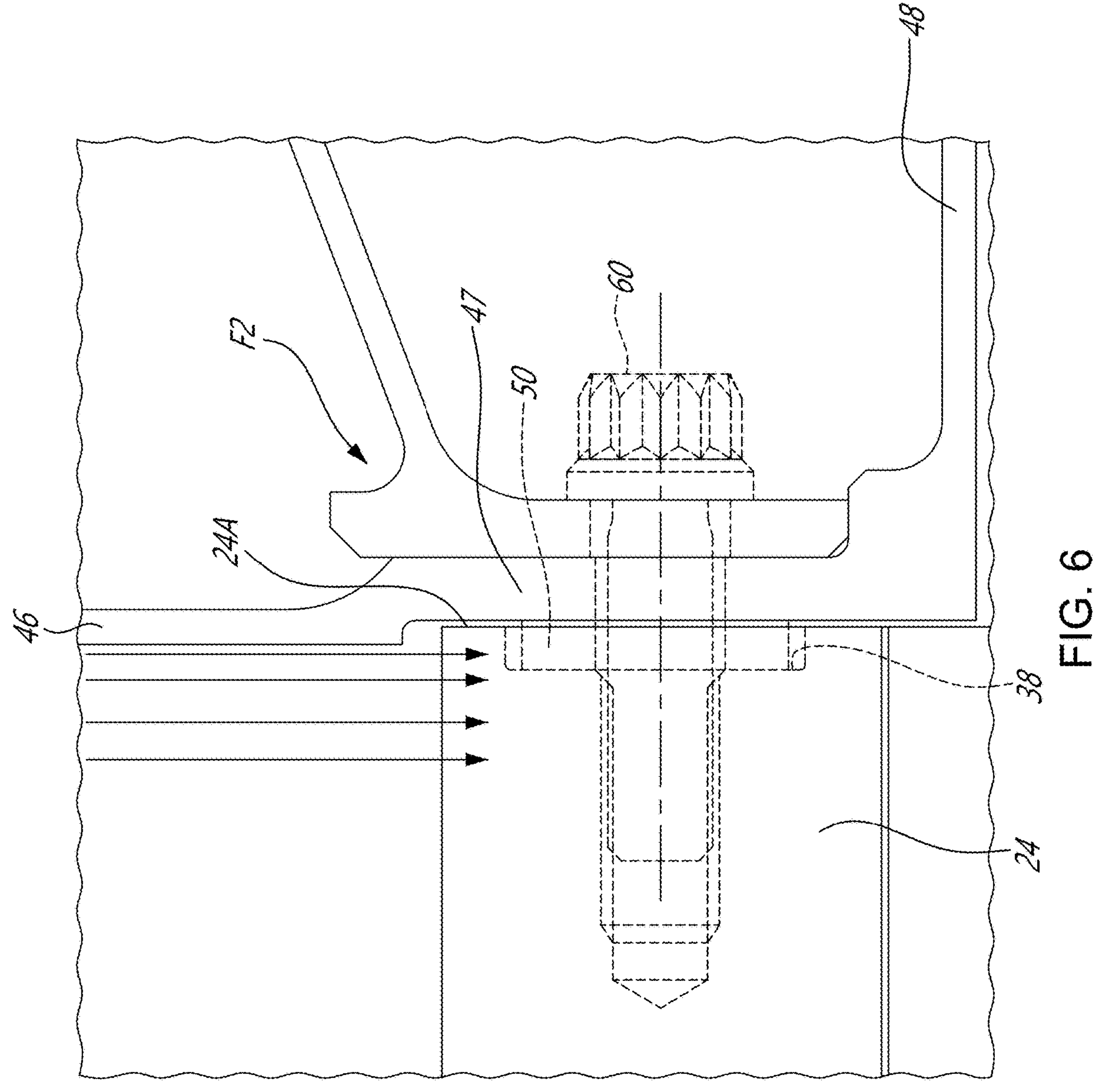
FIG. 6 an enlarged cross-section view of the scroll case assembly illustrating a waterfall step defined in an inwardly facing surface of a rear wall of the outer shell part of the scroll assembly to form a recessed mounting interface between the vanes of the inner vaned part and the outer shell part of the scroll case assembly.

As mentioned hereinbefore, the outer casting 40 may be provided in the form of an outer shell having a first or upstream portion extending in a spiral-like fashion from the inlet 22 to a second or downstream portion extending along an arc of circle around the central axis A. The outer casting 40 has a front annular bolting flange 42 cooperating with the front annular bolting flange 36 of the inner casting 30 to form the first bolted joint interface F1 of the scroll case assembly. As best shown in FIG. 2, the front annular bolting flange 42 of the outer casting 40 extends radially outwardly from an outer diameter surface of a cylindrical projection 44 extending axially forwardly from a front axially facing surface or wall 45 of the outer casing 40. The cylindrical projection 44 of the outer casing 40 is sized to axially fit over the associated cylindrical projection 37 of the inner casting 30. The front annular bolting flange 42 of the outer casting 40 has a plurality of bolt holes for registry with corresponding bolt holes in the front annular bolting flange 36 of the inner casting 30. The outer casting 40 further comprises a rear axially facing surface of wall 46 having a rear annular bolting flange 47 radially aligned with the circumferential array of vanes 24 of the inner casting 30. As shown in FIGS. 2 and 6, the distal ends 24A of the vanes 24 are axially seated against the rear annular bolting flange 47 of the outer casting 40 and individually bolted thereto via a plurality of bolts 60. According to the illustrated embodiments, the second bolted joint interface F2 comprises two bolts 60 per vanes 24. As best show in FIGS. 2-3, a pair of threaded holes 39 may be defined in the distal end 24A of each vane 24. The holes 39 may extend axially through the bottom wall of the respective recesses 38 of the vanes 24. Corresponding registering holes are provided in the spacers 50 to accommodate the bolts 60. Still referring to FIG. 2, it can be appreciated that the outer casting 40 further comprises a central cylindrical projection 48 extending axially rearwardly from the rear surface or wall 46 of outer casting 40. The cylindrical projection 48 axially overlap the cylindrical projection 34 of the inner casting 30 to form the radially outer flow boundary surface of the annular outlet 23 of the assembled scroll case 20. That is the annular axially facing outlet is defined radially between the cylindrical projection 48 of the outer casting 40 and the cylindrical projection 34 of the inner casting 30.

Turning to FIG. 6, it can be appreciated that the rear annular flange 47 of the outer casting 40 may be provided in an axially recessed radially inner annular portion of the rear axially facing surface or wall 46 of the outer casting 40. Indeed, the flow boundary side of the rear axially facing surface or wall 46 of the outer casting 40 may define a “waterfall step” to embed the distal ends 24A of the vanes 24 in the wall of the conduit 21 so as to “conceal” the assembly joint and optimize combustion gas flow through the scroll case 20.

The scroll case 20 can thus be manufactured by designing the scroll case as an assembly of two main parts separately produced and then assembled together to form a complete case assembly. According to some embodiments, the method comprises individually casting two parts and then bolting the two parts together at two different bolted joint interfaces. The parts may be casted to provided for a front bolted interface and a rear bolted interface. The two parts can include an inner casting including a circumferential array of vanes and a front bolting flange and an outer casting in the form of an outer shell adapted to be fitted over the inner casting and having a front and a rear bolting flange. According to some embodiments, the method comprises individually bolting the vanes of the inner casting to the rear bolting flange of the outer casting. The method can further includes providing spacers between the vanes and rear bolting flange of the outer casting to account for tolerance stack-up. Two or more bolts per vane can be used to bolt the vanes to the outer casting. The assembly is completed by bolting the front bolting flanges of the inner and outer castings together.

Still according to some embodiments, there is provided a method for manufacturing a scroll case of an aircraft engine, the scroll case configured to fluidly connect a combustion engine to a turbine section of the aircraft engine, the method comprising: casting an outer shell extending in a non-axisymmetric fashion around a central axis; casting an inner part including a circumferential array of vanes extending axially from a front annular wall; axially inserting the inner part inside the outer shell; and securing the inner part to the outer shell at a front bolted join interface and a rear bolted join interface.

Still according to some embodiments, securing the inner part to the outer shell comprises individually bolting the vanes to the outer shell. Individually bolting the vanes to the outer shell may comprise mounting a spacer in a corresponding recess defined in a distal end of each of the vanes of the circumferential array of vanes.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term “connected” or “coupled to” may therefore include both direct coupling (in which two elements that are coupled to each other contact each other) and indirect coupling (in which at least one additional element is located between the two elements).

It is further noted that various method or process steps for embodiments of the present disclosure are described in the preceding description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms “comprises”, “comprising”, or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, while the outer shell has been described as a casting, it is understood that in some applications the shell could be obtained from other manufacturing techniques. For instance, the outer shell could be made of sheet metal. Yet further modifications could be implemented by a person of ordinary skill in the art in view of the present disclosure, which modifications would be within the scope of the present technology.

The invention claimed is:

1. A scroll case assembly for directing combustion gases to a turbine section of an aircraft engine, the scroll case assembly comprising:

an outer shell extending around a central axis and having an inlet for receiving the combustion gases;

an inner casting received inside the outer shell and defining therewith a conduit extending around the central axis from the inlet to an axially oriented outlet for directing the combustion gases to the turbine section of the aircraft engine, the inner casting having vanes circumferentially distributed around the central axis and projecting axially across the conduit from a front axially facing surface of the inner casting to a rear axially facing surface of the outer shell, the vanes fastened to the rear axially facing surface of the outer shell around the axially oriented outlet;

wherein the front axially facing surface of the inner casting includes a front annular bolting flange the vanes spaced radially inwardly from the front annular bolting flange, and wherein the outer shell has a corresponding front annular bolting flange at a front end thereof opposite to the axially oriented outlet of the conduit, the front annular bolting flange of the outer shell bolted to the front annular bolting flange of the inner casting.

2. The scroll case assembly according to claim 1, wherein the rear axially facing surface of the outer shell includes a rear annular bolting flange spaced radially inwardly from the front annular bolting flange of the outer shell and disposed radially outwardly from the axially oriented outlet of the conduit, wherein the vanes extend axially from the front axially facing surface of the inner casting to respective distal ends, and wherein the respective distal ends of the vanes are individually bolted to the rear annular bolting flange of the outer shell.

3. The scroll case assembly according to claim 2, wherein each of the vanes is fastened to the rear annular bolting flange of the outer shell by two or more bolts threadedly engaged in corresponding threaded holes extending axially through the respective distal ends of the vanes.

4. The scroll case assembly according to claim 2, further comprising spacers received in corresponding recesses defined in the respective distal ends of the vanes, the spacers axially trapped between the respective distal ends of the vanes and the rear annular bolting flange of the outer shell.

5. The scroll case assembly according to claim 4, wherein each spacer has a pair of holes in registry with corresponding holes defined in an associated one of the vanes for receiving a corresponding pair of bolts used for individually bolting each of the vanes to the outer shell.

6. The scroll case assembly according to claim 2, wherein the rear annular bolting flange of the outer shell is located in an axially facing recess defined in a flow boundary side of the rear axially facing surface of the outer shell.

7. The scroll case assembly according to claim 1, wherein the outer shell is a casting.

8. An aircraft engine comprising:

a combustion engine having an exhaust, the combustion engine drivingly engaged to a load rotatable relative to a central axis;

a turbine section in driving engagement with the load to compound power with the combustion engine; and a scroll case assembly fluidly interconnecting the exhaust of the combustion engine to the turbine section, the scroll case assembly comprising:

an outer casting in the form of a shell extending in a non-axisymmetric fashion around the central axis and defining an inlet fluidly connected to the exhaust of the combustion engine;

an inner casting axially inserted inside the outer casting to define therewith a conduit extending around the central axis from the inlet to an outlet fluidly connected to the turbine section of the aircraft engine, the inner casting having vanes circumferentially distributed around the central axis and projecting axially across the conduit from a front axially facing surface of the inner casting to a rear axially facing surface of the outer casting, the inner casting fastened to the outer casting via a first bolted joint interface at a front end of the scroll case assembly and a second bolted joint interface at a rear end of the scroll case assembly, the first bolted joint interface and the second bolted joint interface spaced radially from one another;

wherein the second bolted joint interface includes a rear annular flange provided at a rear axially facing surface of the outer casting and respective distal ends of the vanes, the vanes individually bolted to the rear annular flange of the outer casting around the outlet of the conduit.

9. The aircraft engine according to claim 8, wherein the second bolted joint interface further comprises individual spacers axially trapped between the respective distal ends of the vanes and the rear annular flange of the outer casting.

10. The aircraft engine according to claim 9, wherein the individual spacers are received in corresponding recesses defined in the respective distal ends of the vanes.

11. The aircraft engine according to claim 8, wherein the rear annular flange is provided in an axially recessed annular portion of the rear axially facing surface of the outer casting.

12. The aircraft engine according to claim 8, wherein the second bolted joint interface comprises two or more bolts per vane.

13. The aircraft engine according to claim 8, wherein the first bolted joint interface comprises a front annular flange projecting radially outwardly from an outer diameter surface of a front projection at a front end of the outer casting, and a corresponding front annular flange projecting radially outwardly front an outer diameter surface at a front end of the inner casting, the outer diameter surface at the front end of the inner casting sized to fit inside the front projection of the outer casting.

14. The aircraft engine according to claim 8, wherein the first bolted joint interface is disposed radially outwardly from the second bolted joint interface, the second bolted joint assembly being radially aligned with the vanes relative to the central axis.

15. An aircraft engine comprising:

a combustion engine having an exhaust, the combustion engine drivingly engaged to a load rotatable relative to a central axis;

a turbine section in driving engagement with the load to compound power with the combustion engine; and a scroll case assembly fluidly interconnecting the exhaust of the combustion engine to the turbine section, the scroll case assembly comprising:

an outer casting in the form of a shell extending in a non-axisymmetric fashion around the central axis and defining an inlet fluidly connected to the exhaust of the combustion engine;

an inner casting axially inserted inside the outer casting to define therewith a conduit extending around the central axis from the inlet to an outlet fluidly connected to the turbine section of the aircraft engine, the inner casting having vanes circumferentially distributed around the central axis and projecting axially across the conduit from a front axially facing surface of the inner casting to a rear axially facing surface of the outer casting, the inner casting fastened to the outer casting via a first bolted joint interface at a front end of the scroll case assembly and a second bolted joint interface at a rear end of the scroll case assembly, the first bolted joint interface and the second bolted joint interface spaced radially from one another;

wherein the first bolted joint interface comprises a front annular flange projecting radially outwardly from an outer diameter surface of a front projection at a front end of the outer casting, and a corresponding front annular flange projecting radially outwardly front an outer diameter surface at a front end of the inner casting, the outer diameter surface at the front end of the inner casting sized to fit inside the front projection of the outer casting.

16. The aircraft engine according to claim 15, wherein the first bolted joint interface is disposed radially outwardly from the second bolted joint interface, the second bolted joint assembly being radially aligned with the vanes relative to the central axis.

* * * * *